April 18, 1944.  R. A. SMITH  2,347,135

DEVICE FOR STEERING AUTOMOTIVE VEHICLES

Filed July 21, 1942

INVENTOR
Robert A. Smith
BY
Brown & Jones
ATTORNEYS

Patented Apr. 18, 1944

2,347,135

UNITED STATES PATENT OFFICE 2,347,135

DEVICE FOR STEERING AUTOMOTIVE VEHICLES

Robert Armstrong Smith, Mahwah, N. J.

Application July 21, 1942, Serial No. 451,691

8 Claims. (Cl. 74—552)

This invention relates to steering wheels and more specifically to vibration-relieving steering wheels and grips for automotive vehicles.

In the driving, particularly for long distances, of automobiles and trucks and the like, it has been found that the fatigue of the driver not only causes discomfort to himself but it may also produce resulting conditions dangerous to others.

In the attempt to produce more comfortable and less fatiguing steering conditions, there have been numerous devices brought out such as larger diameter steering wheels and attachments giving larger diameters in part. Also, devices have been suggested wherein the grips have been positioned at various angles with the front-to-rear direction of the car, usually at right angles. Other devices have provided greater clearance between the body and the steering wheel, and still others have provided a yielding portion against the event that the driver is jammed against the steering wheel by a collision in the usual direction of straight forward driving.

While these devices have in part realized the problem of driving fatigue, particularly for trucks and long distance driving, they have not overcome the real problem of making the driving comfortable and relieving fatigue to a sufficient degree.

It has been found by experience that the provision of an arm rest is comfortable for some conditions of driving but experience has also shown that the use of an arm rest over long periods of time transmits vibrations to the arm at approximately the elbow. Such vibrations, in addition to well known vibration through the main steering post, are objectionable and are liable to bring on fatigue pains such as are familiar to those having neuritis.

In other words, it is my belief that the way to drive with the least amount of fatigue is to provide a comfortable driving position and also provide in that position vibration-absorbing or dampening connections so that the vibrations reach the hands and arms of the driver with less shock, partially at least, because they have less amplitude.

Figure 1:
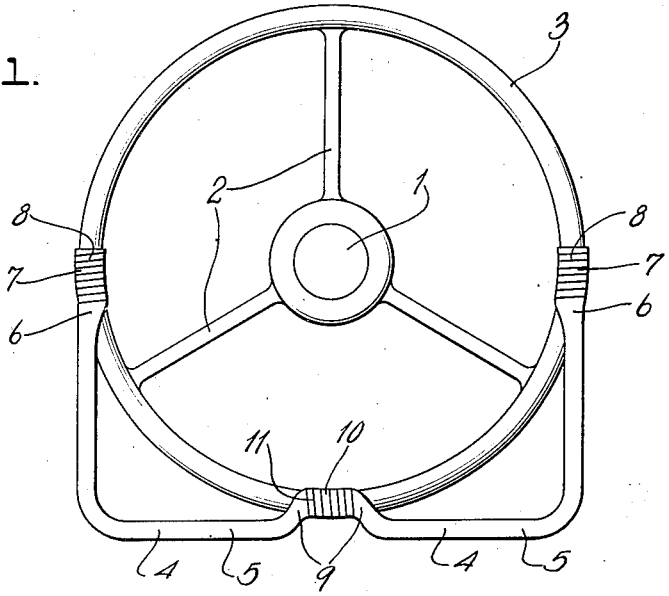
Fig. 1 is a plan view of a steering wheel to which is detachably connected a device embodying one form of the invention.

The steering wheel shown in Fig. 1 is of the usual type, the center 1 being connected by spokes 2 to the rim 3. The vibration-relieving grip 4, which is attachable to the steering wheel, may comprise two grip portions 5 which may be of any desired shape. They may be of any convenient construction. For example, they may consist of rattan cores tightly wrapped within rubber.

The grip portions may be attached to the wheel in various ways. The attachment 6 may be flexible and comprise an extension of the rubber wrapping, which is around the grip, and an attaching piece 7 beyond the extension. The piece 7 is adapted for partially or wholly encircling the rim 3. It may be removably held against the rim by its own binding action or by any proper means such as the wrapping 8, which may be of cord, or a U-shaped spring or screw clamp.

The grip portions 5 may also be caused to adhere to the rim 3 by means which include central flexible elements 9 which are brought up against the rim by the central attaching piece 10. The latter may be bound to the rim by a central attaching wrapping 11 or a clamping device.

It will be seen that the foregoing parts provide handles or grips which are flexibly but firmly attached to the steering wheel and which are in such a position that the hands of a driver, which are holding these grips, are spaced conveniently. That is, the hands fall naturally about where the hands naturally lie of a person seated in the driving position with the hands resting on the thighs. Particularly is this so if the grips 5 are slightly tipped by flexing to the dotted position indicated at A—A—A in Fig. 2, which position, of course, is only one of many which the flexibility of the grips and grip connections permit. The flexed position shown for the connecting and attaching elements is one which gives a comfortable position.

Grips made and attached flexibly to the wheel as described above have sufficient resiliency to be easily brought from their free positions shown in full lines to the positions A—A—A and to spring back essentially into the plane of the rim of the handle when the driver's hands are removed, or to any position for which the particular grip is designed. These grips provide a comfortable position, for the hands either in or below the plane of the rim of the wheel. The holding of the hands in natural position during long drives is restful. The yielding portion, if of greater diameter than the rest of the wheel, yields out of the way of the driver's body when the wheel is turned in steering.

An important feature of the grips and wheel of the present invention is their absorption of the vibrations of the vehicle so that they do not reach the hands. These vibrations, when they reach the hands of a driver, especially in trucks, are quite tiring. The flexible connecting elements and attaching elements accomplish this absorption. They may be of flexible material such as rubber or they may be mechanically capable of absorbing vibrations as by the use of springs, or by ball joints or any desired mechanical combination thereof or other mechanical devices. The reduction in the fatigue of the driver is great. Not only are vibrations in any direction in the plane of the rim absorbed but also vibrations perpendicular to the plane of the rim. The flexible rubber element 6 assists, at least, in accomplishing this. The central flexible element 9 also absorbs vibration.

The spacing of the hands on the grip portions 5 gives a driving grip which is much firmer than the grip obtained when the hands are crowded closely together, and uncomfortably, at the bottom of the usual circular rim. For all ordinary steering movements along relatively straight roads, the hands do not need to be removed from the grip portions 5. For large turns, or backing, or in other cases, the hands can be quickly shifted to grasp any desired portion of the steering wheel. The grips do not interfere.

Figure 2:
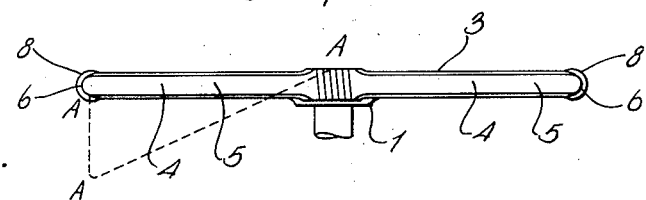
Fig. 2 is a view, taken in the plane of the wheel, of the parts shown in Fig. 1.

Although Figs. 1 and 2 show a conventional steering wheel, the wheel and grips may be constructed in any convenient manner.

Figure 3:
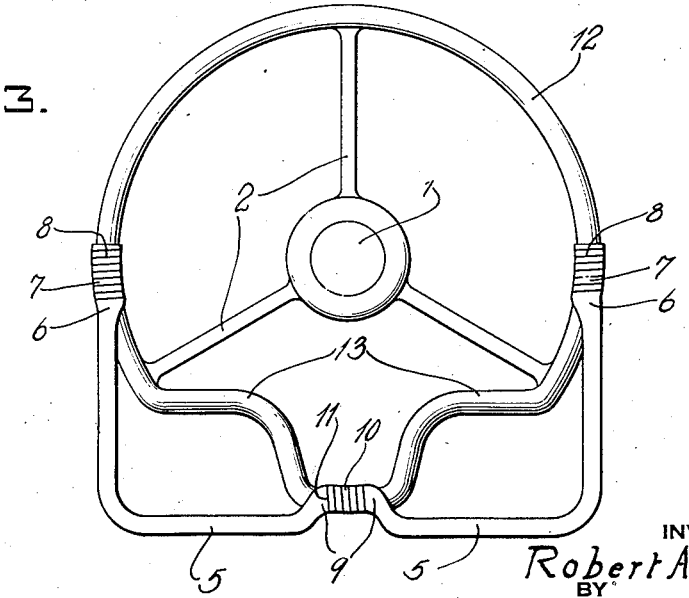
Fig. 3 is a view similar to Fig. 1 of a modified form of the device.

In Fig. 3 there is shown a form of steering wheel which has certain advantages over the conventional type. Portions of the rim 12 are curved inward in the form of turning grips 13. The grip portions 5 operate as above described. On straight sections of road the wheel shown in Fig. 3 is used in the same manner as is that shown in Fig. 1. In making sharp turns, however, the turning grips 13 of the former are of advantage.

What I claim as new and desire to secure by Letters Patent is:

1. In combination with a steering wheel, a supplemental hand grip extending outwardly beyond the rim of said wheel, means for operatively affixing said grip to said wheel at a plurality of spaced positions, said means being adapted to reduce vibrations transmitted from said wheel to said grip, said grip comprising two angularly positioned portions each extending tangentially from the rim of said wheel, said grip in its free position being substantially coplanar with said wheel and being movable downwardly out of said plane.

2. In combination with a steering wheel, a supplemental hand grip extending outwardly beyond the rim of said wheel, means for operatively affixing said grip to said wheel at a plurality of spaced positions subtending an angle of approximately 90 degrees from the center of said wheel, said means being adapted to reduce vibrations transmitted from said wheel to said grip and being adapted to position said grip resiliently substantially in the plane of said wheel, said grip being readily depressible.

3. In combination with a steering wheel, a supplemental hand grip extending outwardly beyond the rim of said wheel, means for operatively affixing said grip to said wheel at a plurality of positions on said wheel rim spaced from each other by an arcuate portion of said rim subtending an angle of approximately 90 degrees, said means being adapted to reduce vibrations transmitted from said wheel to said grip, said grip being movable into and out of the plane of said wheel and being adapted to yield readily when brought into contact with the driver's body.

4. In combination with a steering wheel, a plurality of supplemental spaced hand grips, means for operatively affixing each said grip to said wheel at a plurality of spaced positions, one of said connecting means being common to each said grip, said grips being movable independently into and out of the plane of said wheel, and means to reduce vibrations transmitted from said wheel to said grips.

5. In combination with a steering wheel, a plurality of supplemental spaced hand grips, means for operatively affixing each said grip to said wheel at a plurality of positions spaced from each other on the rim of said wheel by a portion thereof equal substantially to one-fourth the circumference of said wheel and for holding each said grip yieldably substantially in the plane of said wheel, said grips being movable independently into and out of the plane of said wheel, and means to reduce vibrations transmitted from said wheel to said grips.

6. In combination with a steering wheel, a plurality of supplemental spaced hand grips extending outwardly beyond the rim of said wheel, means for operatively affixing each said grip to said wheel at a plurality of spaced positions and for holding each said grip yieldably substantially in the plane of said wheel, said grips being movable independently into and out of the plane of said wheel and being adapted to yield readily when brought into contact with the driver's body, and means to reduce vibrations transmitted from said wheel to said grips.

7. In combination with a steering wheel, a plurality of supplemental spaced hand grips, means for operatively affixing each said grip to said wheel at a plurality of spaced positions, one of said affixing means being common to each said grip and being affixed to that portion of the rim of said wheel normally closest to the driver said grips being movable independently into and out of the plane of said wheel, and means to reduce vibrations transmitted from said wheel to said grips.

8. In combination with a steering wheel having curved in portions of the rim, a plurality of supplemental spaced hand grips said grips positioned adjacently opposite said curved in portions, means for operatively affixing each said grip to said wheel at a plurality of spaced positions, said grips being movable independently into and out of the plane of said wheel, and means to reduce vibrations transmitted from said wheel to said grips, each grip forming with said curved in portions facing said grip positions a double grip convenient to turn the wheel in either direction.

ROBERT A. SMITH.